Patented May 26, 1953

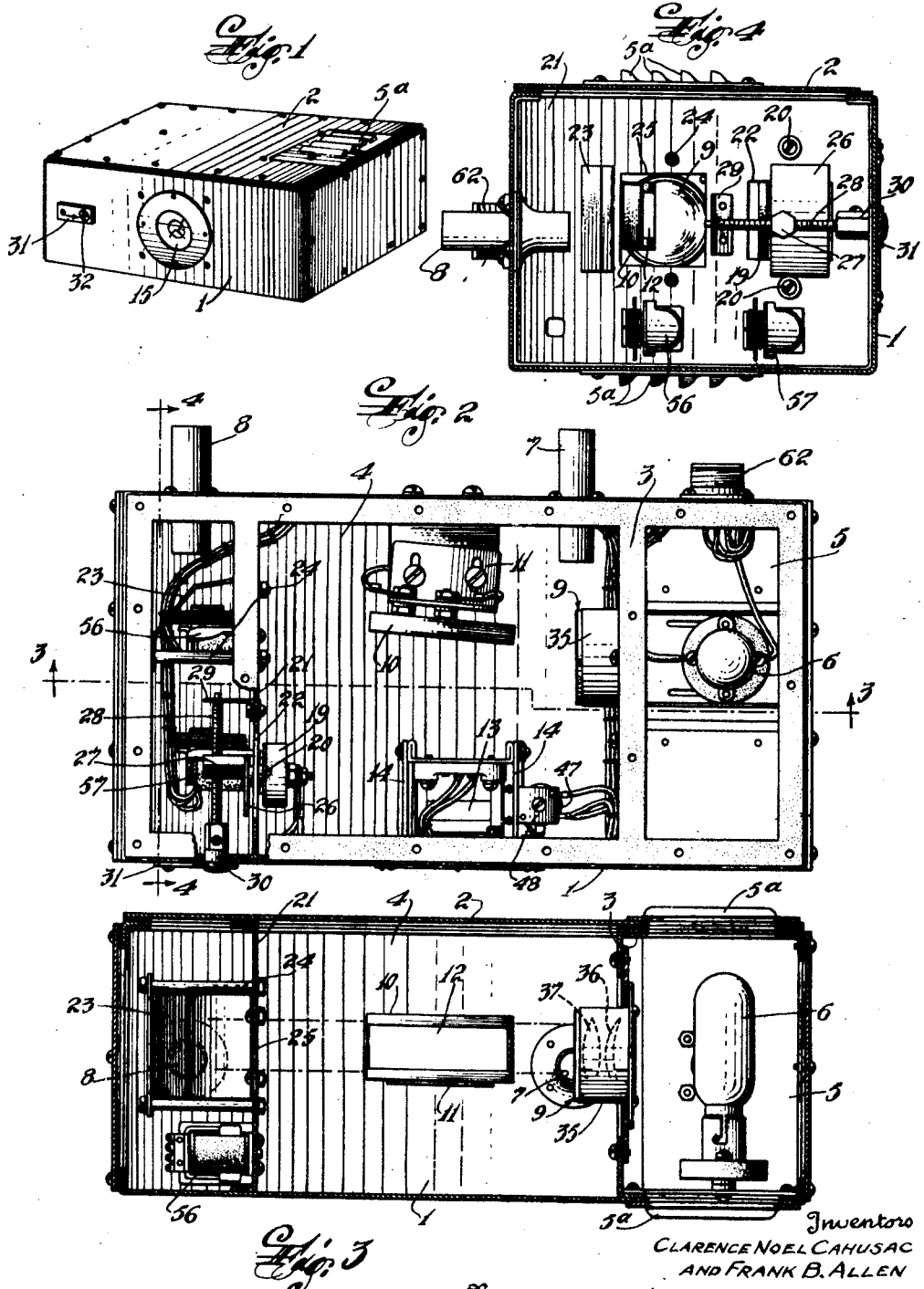

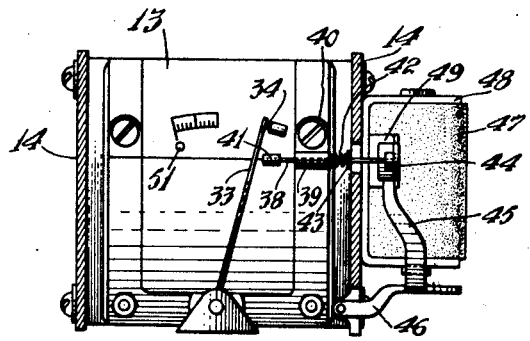
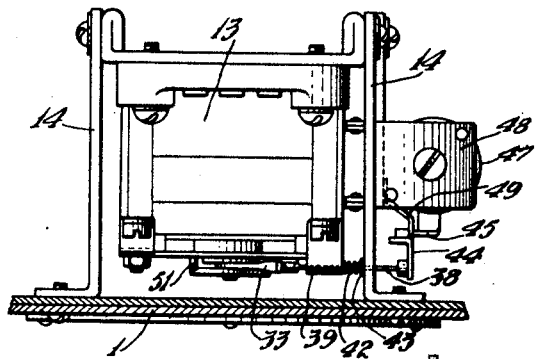
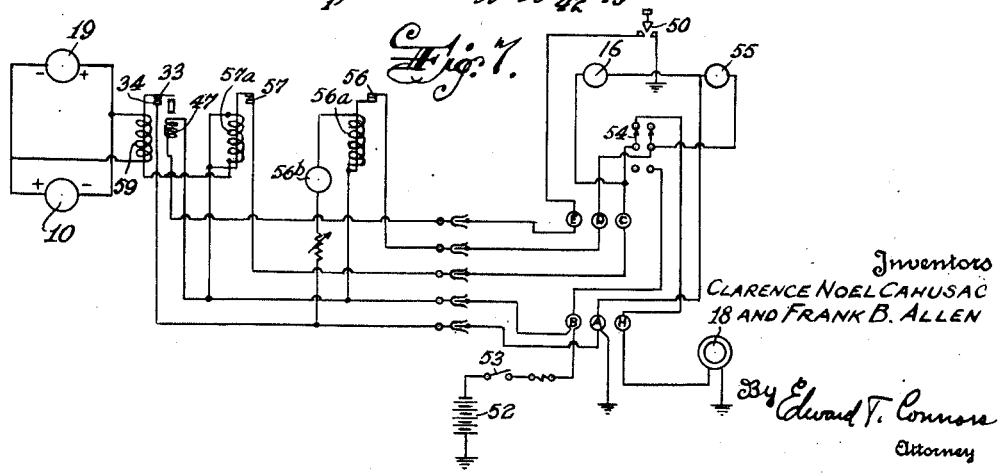

2,640,123

UNITED STATES PATENT OFFICE 2,640,123

SMOKE DETECTOR RELAY AND RESETTING MECHANISM

Clarence Noel Cahusac, Newark, and Frank B. Allen, Towaco, N. J., assignors to C-O-Two Fire Equipment Company, Newark, N. J., a corporation of Delaware Original application July 13, 1945, Serial No. 604,892, now Patent No. 2,464,211, dated March 15, 1949. Divided and this application February 3, 1949, Serial No. 74,342

1 Claim. (Cl. 200—110)

This invention relates generally to apparatus for detecting suspended matter in a fluid, such as smoke, whereby an alarm is given when the smoke is present, and particularly to a relay for closing the alarm circuit and to a resetting mechanism for the relay.

This application is a division of our co-pending application, Serial No. 604,892, filed July 13, 1945, now Patent No. 2,464,211.

In an apparatus of this type a source of light is provided to project a beam of light through a testing compartment having inlet and outlet means for the passage of the fluid to be tested. A photoelectric element is included in the apparatus and arranged to receive light reflected from particles of suspended matter in the fluid. A second photoelectric element is used to monitor the apparatus and indicate any defect therein and is positioned so as to continually receive light from the light source. The two photoelectric elements are connected in opposition and with a sensitive relay. By connecting the photoelectric elements in opposition the stray light which inadvertently falls upon the main photoelectric element is balanced by light received from the source by the second photoelectric element. In the event either of the photoelectric elements becomes inoperative, or in the event the source of light fails, or if suspended particles are present in the fluid stream, an alarm is given. Inasmuch as the output current of the photoelectric elements is very low, it is not used directly to give the alarm, but rather to actuate the sensitive relay which has contacts closing the alarm or trouble indicating circuit.

An object of the present invention is to provide a relay and a resetting mechanism therefor which is simple and economical in manufacture, efficient in operation and durable in use.

In accordance with the invention this is accomplished by providing a relay having a pair of contacts movable relative to each other and by providing means to separate the contacts when they are in the closed position. This construction is advantageous in that means are provided for testing the indication given by the device to ascertain whether or not a faulty operation has occurred such as might result from a jarring of the apparatus or by reason of transitory suspended particles in the fluid stream.

Other objects of the invention will be apparent from the following description and from the accompanying drawings which show, by way of example, an embodiment of the invention.

In the drawings:

Figure 1 is a perspective view of a smoke detector in accordance with the invention.

Figure 2 is an enlarged top view of the smoke detector with its cover plate removed.

Figure 3 is a vertical longitudinal sectional view on the line 3—3 of Figure 2.

Figure 4 is a vertical transverse sectional view on the line 4—4 of Figure 2.

Figures 5 and 6 are enlarged side and top views, respectively, of the sensitive relay.

Figure 7 is a wiring diagram of the detector and signal circuit.

As shown, the invention includes a detecting unit which comprises a casing 1 preferably having at least a removable top wall 2 and also having a partition 3 which divides the casing into a smoke compartment 4 and a compartment 5 for a light source 6 such as an incandescent lamp, said compartment 5 having openings or louvers 5a for passage of air through the compartment. The smoke compartment has a smoke inlet 7 and a smoke outlet 8 and in the partition 3 is a lens system 9 through which light rays from the lamp 6 are directed into and longitudinally of the compartment 4 so that the light rays, represented by the broken lines, are projected in a parallel beam through the compartment 4.

At least one photoelectric element 10 is adjustably mounted on a bracket 11 within the compartment 4 at one side of the light beam so as to be sensitive to light rays reflected from the suspended matter in the stream of fluid entering the casing through the inlet 7. This photoelectric element may be of any suitable type, such as the current generating barrier layer type and preferably has a large flat rectangular exposed light sensitive surface 12 and is capable of generating sufficient current to operate a sensitive relay without amplification of the electricity. Preferably the light sensitive surface is exposed in close proximity to the outer boundaries of the light beam and is tilted obliquely with respect to the light beam so that said surface is inclined away from the light source as shown in Figure 2. Great sensitivity is thus obtained and at the same time the effect of stray light rays when no smoke is present in the compartment is substantially reduced.

The photoelectric element 10 is connected in circuit with any suitable electrical responsive device, for example a micro-ammeter or, as shown, a sensitive relay 13 which may be mounted by a frame 14 on the front wall of the casing with its dial or face exposed through a window 15 in said casing wall; and said sensitive relay controls another circuit which may include any desired electrically operated device such as a signal lamp 16 which may be remotely located, or a howler or audible signal 18 which also may be located at any suitable point. The circuit for connecting the sensitive relay in circuit with a source of electricity, said signals and the photoelectric elements is shown in Figure 5 and will be later described.

Another photoelectric element 19 which may be of the same general type as the element 10 is mounted by bolts 20 on a transverse partition 21 on the casing with its rear side directed toward the light source and its light sensitive surface juxtaposed to an opening 22 in said partition 21 so as to be subject to light rays projected through said opening 22 from a reflector 23 which is mounted by bolts 24 on said partition 21 and is juxtaposed to an opening 25 in said partition at the side of the latter opposite the photoelectric element 19. It will be observed that the light rays from the lens 9 may pass through the opening 25, impinge upon the reflector 23 and be directed thereby through the opening 22 on the light sensitive surface of the photoelectric element 19.

To vary the extent of exposure of the photoelectric element 19 to said reflected light rays, a shutter or baffle plate 26 extends across the opening 22 and has connected thereto a nut 27 through which is threaded a screw 28 one end of which is rotatably mounted in a bracket 29 on the partition 21, while its other end is connected to an adjusting head 30 which is rotatably mounted in a plate 31 on the front wall of the casing 1 and provided with suitable means for rotating it such as kerfs 32 for a screw driver.

The photoelectric element 19 is connected in circuit with the photoelectric element 10 and the sensitive relay 13 in what is known as an "opposed parallel" arrangement or so that the photoelectric effects of said elements are caused to operate in compensating, differential or opposing relation; in other words, the electrodes of the element 19 are connected respectively to the opposite electrodes of the element 10 (see Figure 7).

With this construction, initially the photoelectric cell circuit is so adjusted that the relay 13 or other device will assume a normal condition, for example, to open the signal circuit, when no smoke is present in the casing 1 and when smoke or other fluid containing suspended matter is caused to flow through the casing into the beam of light some of the light rays will be reflected from the solid particles in the stream upon the photoelectric element 10, whereupon the relay or other device 13 will be actuated by the current in the photoelectric cell circuit, for example, to close the signal circuit. In this connection it may be well to point out that the relay 13 has a pointer or swingable contact arm 33 which is responsive to current in the photoelectric cell circuit and normally spaced from a fixed contact 34 but is actuated into engagement with said contact when the photoelectric cell circuit is energized.

It will be observed that the element 10 will be continuously somewhat affected by stray light rays from the beam even when no smoke is present in the compartment 4, and the element will be further affected by slight variations in the intensity or candle power of the light source 6, which without some means to prevent it will result in irregular or unsteady operation of the sensitive relay 13. By rotating a screw 28, the shutter 26 may be adjusted to vary the amount of light reflected from the reflector 23 through the opening 22 upon the balancing element 19, and thus when no smoke is present in the compartment 4, the effect of the light on the element 10 may be balanced by the effect of the light on the element 19 whereby a steady and normal setting of the sensitive relay pointer 33 may be obtained.

Use of reflected light for energizing the photoelectric element 19 results in small current generation by that element and this is advantageous where the light is reflected from the suspended particles in the smoke on the photoelectric element 10 because under such conditions large variations or fluctuations in the candle power of the light source 6 will not materially effect or disturb the contact arm 33 of the sensitive relay. Therefore, this phase of the invention makes it possible to utilize light sources of higher candle power and compensates for large variations in the intensity of the light source.

To obtain a parallel beam of light of maximum diameter consistent with economy in size of light source and the lens, our lens system preferably includes a cylindrical lens holder 35 in which are mounted between the source of light and the element 10 in the order named, a meniscus lens 36 and a convex lens 37. Such a beam of light facilitates generation of adequate current to operate the sensitive relay without current amplification.

When the sensitive relay is energized by electricity generated by the photoelectric element 10, its pointer or contact arm 33 engages the contact 34 which tends to remain in such contact as either or both of the contacts 33 and 34 are made of magnetic material. In accordance with one feature of the invention we provide means for resetting this contact arm from any desired remote point. For this purpose we have shown a resetting rod 38 slidably mounted in a bearing 39 fastened on the frame 40 of the sensitive relay 13 and having a resilient head 41 normally held in spaced relation to the contact arm 33 when the latter engages the contact 34, as shown in Figure 5. For so holding the head 41, a compression spring 42 may be interposed between the bearing 39 and a collar 43 on the rod 38. The end of the rod 38 opposite the head 41 is held by the spring 42 in abutting contact with a flange 44 rigidly connected to an arm 45 on an armature lever 46 which is actuated by an electromagnetic coil 47 which in turn is carried by a bracket 48 secured on the frame 14. Normally the spring 42 holds the lever 46 in spaced relation to the electromagnetic coil and movement of the lever under the influence of the spring is limited by a stop arm 49 on the bracket 48. The electromagnetic coil 47 is connected in an electric circuit with a normally open manually operated switch 50 which preferably is mounted so that when said switch is closed, the coil 47 will be energized to actuate the armature lever 46 and push the resetting rod 38 with a snap action against the contact arm 33 which thereby will be pushed back to its normal position against a zero stop pin 51.

The photoelectric elements, light source, sensitive relay and signals may be connected in circuit in different ways but one possible circuit arrangement is shown in Figure 7 of the drawings. The reference character 52 designates a source of electric current one terminal of which is grounded while the other terminal is connected to one terminal of a main circuit switch 53, the other terminal of which is connected to a binding screw B which in turn is connected to one terminal of a double pole toggle switch 54. Another binding screw A constitutes the ground connection for the circuit while a screw H is connected to one terminal of the howler 18, the other terminal of which is grounded, said screw H also being connected to one terminal of the toggle switch 54. There is also a binding screw E for connecting the resetting switch 50 in circuit with the electromagnetic coil 47, a binding screw D for connecting in the circuit a trouble lamp 55 and a normally closed series relay switch 56 which is mounted on the partition 21 of the casing 1; and a binding screw C which connects in circuit a normally open power relay switch 57 also mounted on the partition 21 of the casing. Preferably a photoelectric exciter lamp 56b is included in the circuit with the coil of the relay 56. The electromagnetic coil 56a for the relay switch 56 is connected to the line circuit through the binding screws A and B while the coil 57a of the relay switch 57 is connected in circuit with and controlled by the sensitive relay switch 33, 34 which in turn is operated by the coil 59 which is connected in circuit with the photoelectric elements 10 and 19.

It will be clear to those skilled in the art that the indicator casing and the various signals and relays may be mounted in any desired locations or zones to be protected.

While we have shown and described our invention as embodied in certain details of construction it should be understood that this is primarily for illustrating the principles of the now preferred embodiment of the invention and that the structural details may be modified or changed, all within the spirit and scope of the invention.

We claim:

A smoke detector resetting relay comprising a frame, a relay coil supported by the frame, pivotal mounting means on the frame, a swingable relay switch arm carried by the pivotal mounting means, a contact carried by the arm, a fixed contact to cooperate with the movable contact, magnetic material incorporated with one of said contacts to hold the contacts together after contact has been made therebetween, a resetting rod to separate the moving contact from the fixed contact, a knob at the outer end of the resetting rod, means at one end of the relay frame providing a bearing member for the reciprocation of the resetting rod, resilient means to urge the resetting rod away from the movable contact, a vertically positioned resetting coil positioned at the side of the frame adjacent the resetting rod, a resiliently-urged swingable resetting coil armature positioned under the resetting coil and movable upwardly thereagainst, a resetting rod actuating member extending from a side of the armature and adapted to engage the knob of the resetting rod to move it inwardly to cause the separation of the contacts, and a stop arm for the resetting rod actuating member to limit its swing so that the armature is held within operating distance of the resetting coil.

CLARENCE NOEL CAHUSAC.
FRANK B. ALLEN.

References Cited in the file of this patent

UNITED STATES PATENTS

| Number | Name | Date |
| --- | --- | --- |
| 727,567 | Apple | May 12, 1903 |
| 1,058,178 | Hart | Apr. 8, 1913 |
| 1,654,102 | Thompson | Dec. 27, 1927 |
| 2,062,915 | Lamb | Dec. 1, 1936 |
| 2,281,687 | Fowler | May 5, 1942 |
| 2,565,312 | Lamb | Aug. 21, 1951 |